U S009715545B2

United States Patent
Laredo et al.

(10) Patent No.: US 9,715,545 B2
(45) Date of Patent: Jul. 25, 2017

(54) CONTINUOUS COLLECTION OF WEB API ECOSYSTEM DATA

(71) Applicant: International Business Machines Corporation, Armonk, NY (US)

(72) Inventors: Jim A. Laredo, Katonah, NY (US); Vinod Muthusamy, Toronto (CA); Aleksander A. Slominski, Riverdale, NY (US); Biplav Srivastava, Noida (IN); Maja Vukovic, New York, NY (US); John E. Q. Wittern, Berlin (DE)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 14/302,756

(22) Filed: Jun. 12, 2014

(65) Prior Publication Data

US 2015/0363493 A1     Dec. 17, 2015

(51) Int. Cl.
G06F 17/30      (2006.01)
H04L 29/08      (2006.01)

(52) U.S. Cl.
CPC .. G06F 17/30864 (2013.01); G06F 17/30342 (2013.01); H04L 67/02 (2013.01)

(58) Field of Classification Search
CPC ......... G06F 17/30864; G06F 17/30342; H04L 67/02
See application file for complete search history.

(56) References Cited

U.S. PATENT DOCUMENTS

| 5,542,078 | A | 7/1996 | Martel et al. |
| 5,870,559 | A * | 2/1999 | Leshem .................. G06F 11/32 707/E17.116 |
| 7,058,655 | B2 | 6/2006 | Goldberg et al. |
| 8,074,160 | B2 | 12/2011 | Fry et al. |

(Continued)

FOREIGN PATENT DOCUMENTS

| EP | 0948225 B1 | 7/2008 |
| WO | 2008111051 A2 | 2/2010 |

(Continued)

OTHER PUBLICATIONS

Teradata, "Unity Ecosystem Manager Event System API Reference", Jan. 2014, Release 14.10, pp. 1-88.*

(Continued)

*Primary Examiner* — Apu Mofiz
*Assistant Examiner* — Jared Bibbee
(74) *Attorney, Agent, or Firm* — Yee & Associates, P.C.; Louis Percello

(57) ABSTRACT

An embodiment of the invention comprises a method associated with a Web API ecosystem and API users includes identifying specified events over a period of time that respectively affect the ecosystem. Events can comprise an interaction between the ecosystem and a Web API user or a specified Web API. The embodiment further includes constructing a data structure that contains a data element representing each identified event. An interface is used to translate respective data elements between the data structure and a data store, wherein the data store represents translated (Continued)

data elements in a form different from that used to represent the data elements in the data structure.

20 Claims, 5 Drawing Sheets

(56) References Cited

U.S. PATENT DOCUMENTS

| | | | | |
|---|---|---|---|---|
| 8,458,596 | B1* | 6/2013 | Malks | G06Q 10/06 715/742 |
| 9,037,964 | B2 | 5/2015 | Appleyard et al. | |
| 2003/0135503 | A1 | 7/2003 | Goldberg et al. | |
| 2007/0104100 | A1 | 5/2007 | Davey et al. | |
| 2008/0097941 | A1 | 4/2008 | Agarwal | |
| 2008/0209451 | A1* | 8/2008 | Michels | G06F 15/16 719/328 |
| 2008/0221867 | A1 | 9/2008 | Schreiber | |
| 2009/0006152 | A1 | 1/2009 | Timmerman et al. | |
| 2009/0204594 | A1* | 8/2009 | Akkiraju | G06F 8/34 |
| 2009/0235285 | A1* | 9/2009 | Kim | G06F 17/30961 719/328 |
| 2012/0016653 | A1 | 1/2012 | Bhandar et al. | |
| 2012/0047130 | A1 | 2/2012 | Perez et al. | |
| 2012/0054065 | A1 | 3/2012 | Sung et al. | |
| 2012/0159441 | A1 | 6/2012 | Ghaisas | |
| 2013/0159960 | A1 | 6/2013 | Sivaramakrishnan et al. | |
| 2013/0332473 | A1* | 12/2013 | Ryman | G06F 17/30569 707/754 |
| 2014/0090020 | A1* | 3/2014 | Meiners | H04L 67/34 726/4 |
| 2014/0114805 | A1 | 4/2014 | Akolkar et al. | |
| 2014/0180868 | A1 | 6/2014 | Kanigsberg et al. | |
| 2014/0310302 | A1* | 10/2014 | Wu | G06F 17/30442 707/769 |
| 2014/0359553 | A1 | 12/2014 | Park et al. | |
| 2014/0379885 | A1* | 12/2014 | Krishnamurthy | H04L 45/56 709/223 |
| 2015/0074672 | A1* | 3/2015 | Yeddanapudi | H04L 47/11 718/103 |
| 2015/0121401 | A1 | 4/2015 | Laredo et al. | |
| 2015/0149484 | A1 | 5/2015 | Kelley | |
| 2015/0268949 | A1 | 9/2015 | Huber et al. | |
| 2015/0363492 | A1 | 12/2015 | Laredo et al. | |
| 2015/0378692 | A1 | 12/2015 | Dang et al. | |

FOREIGN PATENT DOCUMENTS

| | | |
|---|---|---|
| WO | 2013056104 A1 | 10/2012 |
| WO | 2013096506 A1 | 12/2012 |

OTHER PUBLICATIONS

Office Action, dated May 20, 2016, regarding U.S. Appl. No. 14/623,156, 61 pages.
Office Action, dated May 20, 2016, regarding U.S. Appl. No. 14/743,171, 42 pages.
Wittern et al., "A Graph-based Data Model for API Ecosystem Insights," Proceedings of the 21 IEEE International Conference on Web Services (ICWS), Jun.-Jul. 2014, 8 pages.
Akolkar et al., "Automatic Modification of Requirements Based on Consumption and Market Changes," U.S. Appl. No. 14/563,104, filed Dec. 8, 2014, 36 pages.
Cuomo et al., "Supporting Software Application Developers to Iteratively Refine Requirements for Web Application Programing Interfaces," U.S. Appl. No. 14/623,156, filed Feb. 16, 2015, 34 pages.
Bianchini et al., "A Multi-perspective Framework for Web API Search in Enterprise Mashup Design," Advanced Information Systems Engineering, Jan. 2013, pp. 353-368.
List of IBM Patents or Patent Applications Treated as Related, 1 page.
"Cluster analysis," Wikipedia Foundation, Inc., dated Jan. 16, 2014, 17 pages. Accessed Jan. 18, 2014, en.wikipedia.org/wiki/Cluster_analysis.
"Graph Based Recommendation Systems at eBay," Planet Cassandra, Mar. 25, 2013, 18 pages. Accessed Jan. 15, 2014, http://www.slideshare.net/planetcassandra/e-bay-nyc.
"Web API," Wikipedia Foundation, Inc., dated Dec. 7, 2013, 2 pages. Accessed Jan. 14, 2014, en.wikipedia.org/wiki/Web_API.
Belhajjame et al., "PROV-O: The PROV Ontology," W3C, Apr. 30, 2013, 71 pages. Accessed Feb. 10, 2014, http://www.w3.org/TR/prov-o/.
Cohen et al, "A Comparison of String Distance Metrics for Name-Matching Tasks," Proceedings of the Eighteenth International Joint Conference on Artificial Intelligence (IJCAI-03) Workshop on Information Integration, Aug. 2003, pp. 73-78.
Dojchinowski et al., "Personalised Graph-Based Selection of Web APIs," In the Semantic Web—ISWC, Nov. 2012, pp. 34-48.
Foggia et al, "A Graph-Based Clustering Method and Its Applications," Advances in Brain, Vision, and Artificial Intelligence, Jan. 2007, pp. 277-287.
Gantner et al., "RPG: APIs," IBM Redbooks, Dec. 2007, pp. 1-78.
Georgescu, "WSRP-Enabled Distributed Data Mining Services Deliverable over a Knowledge-Driven Portal," Proceedings of the 7th WSEAS International Conference on Applied Computer & Applied Computational Science, Apr. 2008, pp. 150-155.
Huang et al., "Service Recommendation in an Evolving Ecosystem—A Link Prediction Approach," IEEE 20th International Conference on Web Services (ICWS), Jun.-Jul. 2013, pp. 507-514.
Kawaji et el., "Graph-based clustering for finding distant relationships in a large set of protein sequences," Bioinformatics, vol. 20, No. 2, Jan. 2004, pp. 243-252.
Lee et al., "A Generic Graph-based Multidimensional Recommendation Framework and Its Implementations," Proceedings of the 21st International Conference Companion on world Wide Web, Apr. 2012, pp. 161-165.
Moore et al., "WebSphere Business Integration Server Foundation Using the Programming API and the Common Event Infrastructure," IBM Redbooks, Apr. 2005, 240 pages.
Popov, "Release Update: The new Apiphany Analytics System is here!," Apiphany, Apr. 9, 2013, 4 pages. Accessed Feb. 10, 2014, http://apiphany.com/blog/release-update-the-new-apiphany-analytics-system-is-here.
Rodriguez, "A Graph-Based Movie Recommender Engine," Sep. 22, 2011, 12 pages. Accessed Jan. 15, 2014, http://markorodriguez.com/2011/09/22/a-graph-based-movie-recommender-engine/.
Schaeffer, "Graph clustering," Computer Science Review, vol. 1, No. 1, Aug. 2007, pp. 27-64. geza.kzoo.edu/~erdi/patent/Schaeffer07.
Torres et al., "Improving Web API Discovery by Leveraging Social Information," IEEE International Conference on Web Services (ICWS), Jul. 2011, pp. 744-745.
Wang et al., "Graph-Based Recommendation on Social Networks," IEEE 12th International Asia-Pacific Web Conference (APWEB), Apr. 2010, pp. 116-122.
Xu et al., "A Model-based Approach to Attributed Graph Clustering," Proceedings of the 2012 ACM SIGMOD International Conference on Management of Data, May 2012, 12 pages.
Zhong et al., "MAPO: Mining and Recommending API Usage Patterns," Genoa Proceedings of the 23rd European Conference on ECOOP, Jul. 2009, 25 pages.
Zhou et al., "Graph Clustering Based on Structural/Attribute Similarities," Proceedings of the VLDB Endowment, Aug. 2009, 12 pages.
Laredo et al., "Graph Based Data Model for API Ecosystem Insights," U.S. Appl. No. 14/180,686, filed Feb. 14, 2014, 43 pages.
Laredo et al., "Use of Collected Data for Web API Ecosystem Analytics," U.S. Appl. No. 14/302,517, filed Jun. 12, 2014, 47 pages.
Cuomo et al., "Supporting Software Application Developers to Iteratively Refine Requirements for Web Application Programming Interfaces," U.S. Appl. No. 14/743,171, filed Jun. 18, 2015, 31 pages.

(56) References Cited

OTHER PUBLICATIONS

List of IBM Patents or Patent Applications Treated as Related, 2 pages.
Office Action, dated Jan. 22, 2016, regarding U.S. Appl. No. 14/180,686, 33 pages.
Office Action, dated Mar. 2, 2016, regarding U.S. Appl. No. 14/302,517, 31 pages.
Lim et al., "App Epidemics: Modelling the Effects of Publicity in a Mobile App Ecosystem," Artificial Life, vol. 13, Jul. 2012, pp. 202-209.
Nguyen et al., "A Graph-based Approach to API Usage Adaptation," Proceedings of the ACM International Conference on Object Oriented Programming Systems Languages and Applications (OOPSLA '10), Oct. 2010, pp. 302-321.
Weiss et al., "Modeling the mashup ecosystem: structure and growth," R&D Management, vol. 40, No. 1, Jan. 2010, pp. 40-49.
Notice of Allowance, dated Apr. 12, 2016, regarding U.S. Appl. No. 14/180,686, 15 pages.
Notice of Allowance, dated Apr. 20, 2016, regarding U.S. Appl. No. 14/302,517, 9 pages.
Notice of Allowance, dated Oct. 25, 2016, regarding U.S. Appl. No. 14/623,156, 17 pages.
Notice of Allowance, dated Oct. 21, 2016, regarding U.S. Appl. No. 14/743,171, 16 pages.

\* cited by examiner

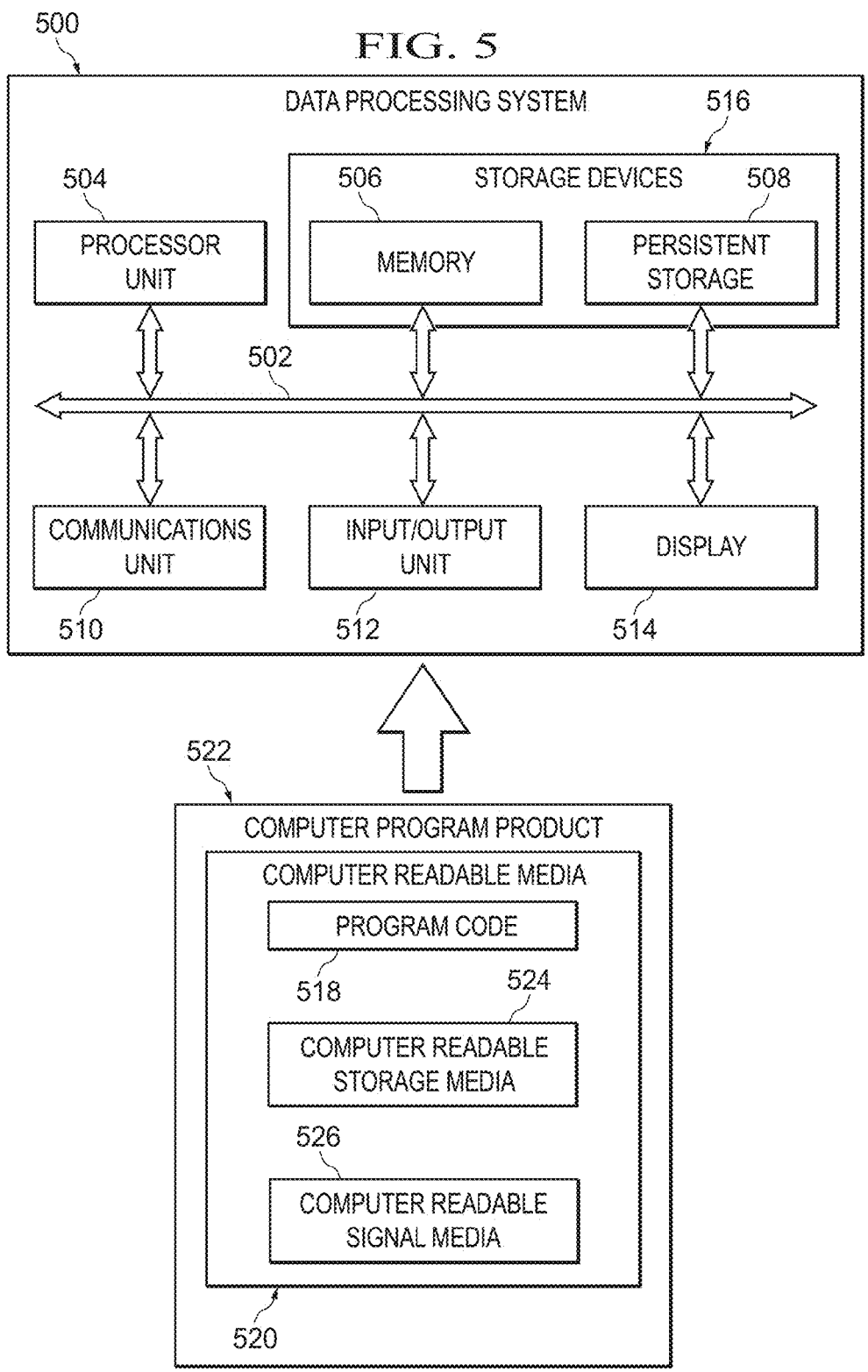

CONTINUOUS COLLECTION OF WEB API ECOSYSTEM DATA

BACKGROUND OF THE INVENTION

Field of the Invention

The invention disclosed and claimed herein generally relates to continuous collection of data that pertains to an Application Programming Interface (API) ecosystem, wherein the data to be collected is produced by interactions between the ecosystem, and API users and API systems. More particularly, the invention pertains to collection of Web API ecosystem data, as the term "Web API" is defined herein.

Description of Related Art

As is well known by those of skill in the art, Application Programming Interfaces, or APIs, are increasingly important for integrating with different APIs, applications and functionalities. APIs are also important for companies and others, to enable partners and consumers to access respective company services and resources. An API ecosystem comprises an arrangement, such as a marketplace or developer site, wherein participants in API related activities have one of three roles, and typically have multiple relationships with other participants. These three roles include the API provider, API consumer, and API ecosystem provider.

API ecosystems, including Web API ecosystems, must deal with related challenges, such as publication, promotion and provision of Web APIs by providers, and identification, selection and consumption of Web APIs by consumers. In order to address these challenges, as well as to match consumers with relevant APIs, to support API providers, and to thus ultimately assist API ecosystem evolution, relevant information must be made available for API ecosystems. This information includes API usage, API characteristics, and the social environment around or associated with a particular API ecosystem, but is not limited thereto.

Notwithstanding the importance of information of the above type, current methods for acquiring such information tend to be rather limited. For example, current methods include approaches that are based upon crawling of information. Such methods are comparatively inefficient, and can be too inadequate to collect the amounts of data that are increasingly required.

SUMMARY

As users and systems interact with Web API ecosystems and the Web APIs, a plethora of data is generated, which can be used to obtain information and insights into the ecosystem. Embodiments of the invention are configured to collect such data, resulting from interactions with a particular Web API ecosystem. These embodiments are provided to ensure that the data is continuously collected, and that collected data is both current and complete. The embodiments may also collect other useful data that is related to the particular Web API ecosystem as described hereinafter in further detail. Moreover, a Web API graph associated with the particular ecosystem may be used to interrelate the collected data, as the basis for analytics or analysis operations.

An embodiment of the invention comprises a method associated with a web API ecosystem and one or more API users. The method includes the step of identifying specified events over a given period of time that respectively affect the web API ecosystem, wherein at least one of the events comprises an interaction between the web ecosystem and either a web API user, or specified web API, selectively. The method further includes constructing a data structure that contains a data element representing each identified event. A specified interface is used to translate respective data elements between the data structure as a specified data store, wherein the specified data store represents each translated data element in a form which is different from the form used to represent the data element in the specified data structure.

The term "Web API", as defined and used herein, and as known and used by those of skill in the art, means and refers to a server-side API on a Web server. A server-side Web API is a programmatic interface to a defined request-response message system, which is exposed via the web such as by means of an HTTP-based web server. Mashups are Web applications that combine the use of multiple Web APIs of the above type. The term "Web API" may also refer to a client-side API within a web browser.

In view of the above definitions, all uses herein of the terms "API" and "application programming interface" are to be interpreted as referring to, or to mean, "Web API" and "Web application programming interface", respectively. Herein, "API" is used only as a convenient abbreviation of the term "Web API".

BRIEF DESCRIPTION OF THE SEVERAL VIEWS OF THE DRAWINGS

FIG. 5 is a block diagram showing a computer or data processing system that may be used in implementing embodiments of the invention.

DETAILED DESCRIPTION

Figure 1:
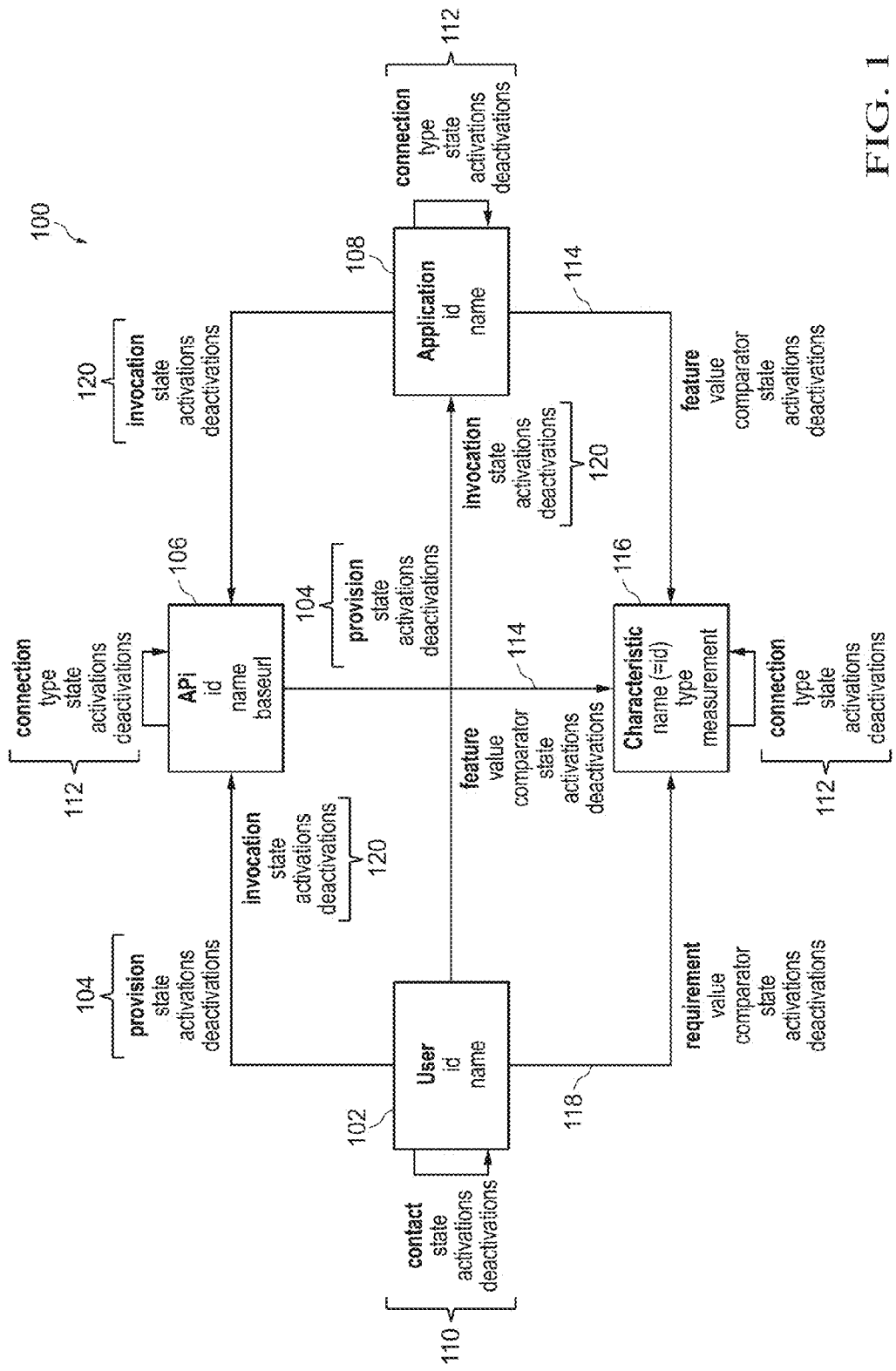
FIG. 1 is a block diagram showing a core structure of a Web API graph for use with an embodiment of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In embodiments of the invention, continuous collection of data includes collection of two or more types of data. One type of data comprises events that occur in an associated Web API ecosystem, and are live-logged. That is, the events are entered into a log or record at the times when they respectively occur. These events could be interactions between the Web API ecosystem, and either API users or a specified API system. The events could also represent changes to the Web API ecosystem.

Another type of data comprises the results provided by certain analysis operations or activities, such as specific API usage queries that are carried out using information related to the Web API ecosystem, or to components or elements thereof. For embodiments of the invention, a unique graph-based data structure or data model is used in the continuous collection or capture of both types of data.

Referring to FIG. 1, there is shown a unique data structure as referred to above, for an embodiment of the invention. More particularly, FIG. 1 shows a core structure 100 of a Web API graph, comprising a graph-based data model. The Web API graph captures or collects data which pertains to respective entities included in a Web API ecosystem, and also which pertains to relationships between such entities and others. Moreover, the API graph of FIG. 1 collects data continually, and thus provides a means for continuously collecting all data needed for an associated API ecosystem. This includes data regarding both API features and relationships. Moreover, the API graph is extensible. That is, if elements such as new users, APIs or relationships are added to the API ecosystem, the graph is extended to represent these new elements.

In addition, it is anticipated that an API ecosystem will change or evolve over time. Accordingly, an embodiment of the invention includes the capability of applying temporal or timing information to event data which is captured by the API graph of the data model, wherein the event data indicates changes of various types. A record of these changes thus captures the evolution of the API ecosystem over time. This information timing capability is described hereinafter, in further detail.

Referring further to FIG. 1, core structure 100 of the API graph is defined as a property graph, in which both nodes and edges (representing relationships between nodes) have properties specified as key-value or key-attribute pairs. This graph structure further attempts a balancing act. That is, it intends to perform a set of meaningful analysis operations described hereinafter, while not requiring a verbose and potentially off-putting structure. To achieve this balance, the embodiment of FIG. 1 initially captures fundamental concepts of a Web API ecosystem, and explicitly allows the data model to evolve over time. FIG. 1 illustrates the nodes and relationships denoting the API graph core structure 100. These elements are also used as the API graph extends, i.e., has additional nodes and relationships added to it.

User nodes 102 represent humans or organizations that interact with a particular Web API ecosystem. User node 102 has provision relationships 104 or invocation relationships 120 to nodes representing API nodes 106, or to application nodes 108. Depending on the existence of these relationships, users act either as Web API providers, Web API consumers, or Web API ecosystem providers. Between user nodes 102, contact relationships 110 capture social structures, for example, that users are friends or follow each other's choices. Application nodes 108, representing for example mash-ups (applications) in Programmable Web, also invoke API nodes 106. Both API and application nodes can have connection relationships 112 to denote, for example, dependencies to other APIs or applications.

API and application nodes may also have feature relationships 114 to characteristic nodes 116. Characteristic nodes 116 represent functionalities or non-functionalities that are potentially shared among APIs or applications. For example, characteristic nodes 116 represent categories like "social" or "location-based", data formats like "JSON" OR "XML", or qualities like "cost per request" or "availability". The concrete value that an API 106 or application 108 has with regard to a characteristic node 116 is denoted in the properties of the feature relationship 114. For example, an API's feature relationship 114 to the characteristic "cost per request" with "measurement: $" can denote the properties "value: 0.05" and "comparator: equals". User nodes 102 can have requirement relationships 118 to characteristic nodes 116 that (similar to feature relationships 114) capture quantitative information about the requirement.

To summarize the data storing capabilities of some of the node and edge elements of the API graph described above, when a user signs up to the associated Web API ecosystem, a corresponding node is posted to the API graph or core structure 100. When a Web API is registered to the Web API ecosystem, a corresponding node is likewise posted to the API graph. A provision relationship between the API node and the node representing the user is also created. Each endpoint of the API is also represented with a corresponding API node. A connection relationship of type "parent API" between the nodes representing the endpoint and the API is created. Thus, it is seen that respective nodes and edges of the API graph, as illustrated by core structure 100, provide a comprehensive repository for storing data that represents respective entities, conditions, states and changes of the associated API ecosystem.

The core structure 100, while comprising a simplified example, still provides a rich set of relationships. This becomes clear when mapping web data, exemplified by Programmable Web data, as the web data is reported to the graph structure. Based on the data, nodes 106 for APIs, nodes 108 for mash-ups (applications), and the user nodes 102 who created them, can respectively be created. Invocation relationships 120 between mash-ups and APIs, and provision relationships 104 between users and API/mash-ups can also be derived. Further, categories contained in the Programmable Web data can be represented as characteristic nodes 116 with feature relationships 114, from the corresponding APIs/mash-ups to the characteristics. Thus, by way of example, the complete Programmable Web data is mappable to the API graph, whose core dataset constitutes a superset. Additionally, the API graph allows capturing quantitative information about characteristics (using properties in feature relationships 114 and requirements relationships 118) and keeps track of the invocations 120 a user performs for each API and application.

Capturing the required data from a Web API ecosystem is enabled through the system of the API graph, which denotes required interfaces to collect data. The interfaces are described hereinafter in further detail, in connection with FIG. 2.

Web API ecosystems are subject to constant change, and correspondingly evolve over time. For example, users, Web APIs, and applications enter and leave the ecosystem, their usage is volatile and their characteristics change. The Web API graph 100 is capable of keeping track of these changes. Thus, its analysis operations provide the potential to better deal with the changes. Web API providers can detect and react to changing demand or competition, Web API consumers can obtain information about novel APIs to consume, and ecosystem providers can gain insights into how the ecosystem evolves over time.

To collect temporal information, all relationships in the Web API graph 100 denote a state property, and capture time stamps of events pertaining to activation and inactivation properties, as illustrated in FIG. 1. More particularly, FIG. 1 explicitly shows that each of the relationships 104, 110-114 and 118-120 has a state property, an activation property and a deactivation property. On creation, a relationship obtains a first activation property, representing the creation date. Subsequent re-establishments of that relationship produce additional activation properties, thus capturing the relationship's currentness and relevance. For example, an invocation relationship 120 keeps track of the evolution of when and to what extent a user node 102 consumes an API node 106. With the creation and each re-establishment, the relationship's state property will be set to active. On the other hand, deletion of a relationship will not result in its data being dismissed. Rather, a deactivation property will capture the time of the deletion, and the relationship's state property will be set to inactive. This way, knowledge about the prior existence of a relationship is not lost due to data dismissal. Further, a history, for example about frequent changes of a relationship's state, can reveal patterns of interest. Using this mechanism, relationships may also be marked inactive automatically if they are not established for a certain period of time. One potential concern is the accumulation of data, which would eventually negatively impact performance. To avoid this, ancient data can be summarized, stating for example the amount of re-establishments in a certain time period within one property. Here, a trade-off between amount of data and its granularity must be chosen by the user.

It will be seen that by capturing the above temporal information, a database of such information is made available, for tracking usage of related ecosystem components. For example, the information could be used to determine whether a given API is being consumed more frequently or less frequently, by respective users. More generally, the temporal information could enable users to gain significant insights into evaluation of the ecosystem. Such insights, by way of example, could be directed to how the consumption of an API evolved, when an API did and did not denote corrections, and how requirements change over time.

As a further example of temporal information, FIG. 1 shows user node 102 having an invocation relationship 120 that could be as follows, by way of example:

| Invocation |
|---|
| activation: 2013/01/04 |
| activation: 2013/04/13 |
| activation: 2013/08/01 |
| activation: 2013/08/02 |
| activation: 2013/08/03 |
| activation: 2013/08/04 |
| . . . |
| deactivation: 2013/08/18 |

This example shows that invocations became frequent in August, 2013. Explicit deactivation of relationships 120 then occurred, possibly because API node 106 was substituted with another API.

The above example further emphasizes the capability of core structure 100 of the API graph to continuously collect data pertaining to interaction events and change events that occur in an API ecosystem associated with the API graph. For instance, the API of node 106 first became active in the ecosystem on 2013 Jan. 4 and was deactivated from the ecosystem on 2013 Aug. 18. The example also shows that the state of respective elements of the API graph at a given time will indicate the state of the comparable elements of the Web API ecosystem at the given time.

Figure 2:
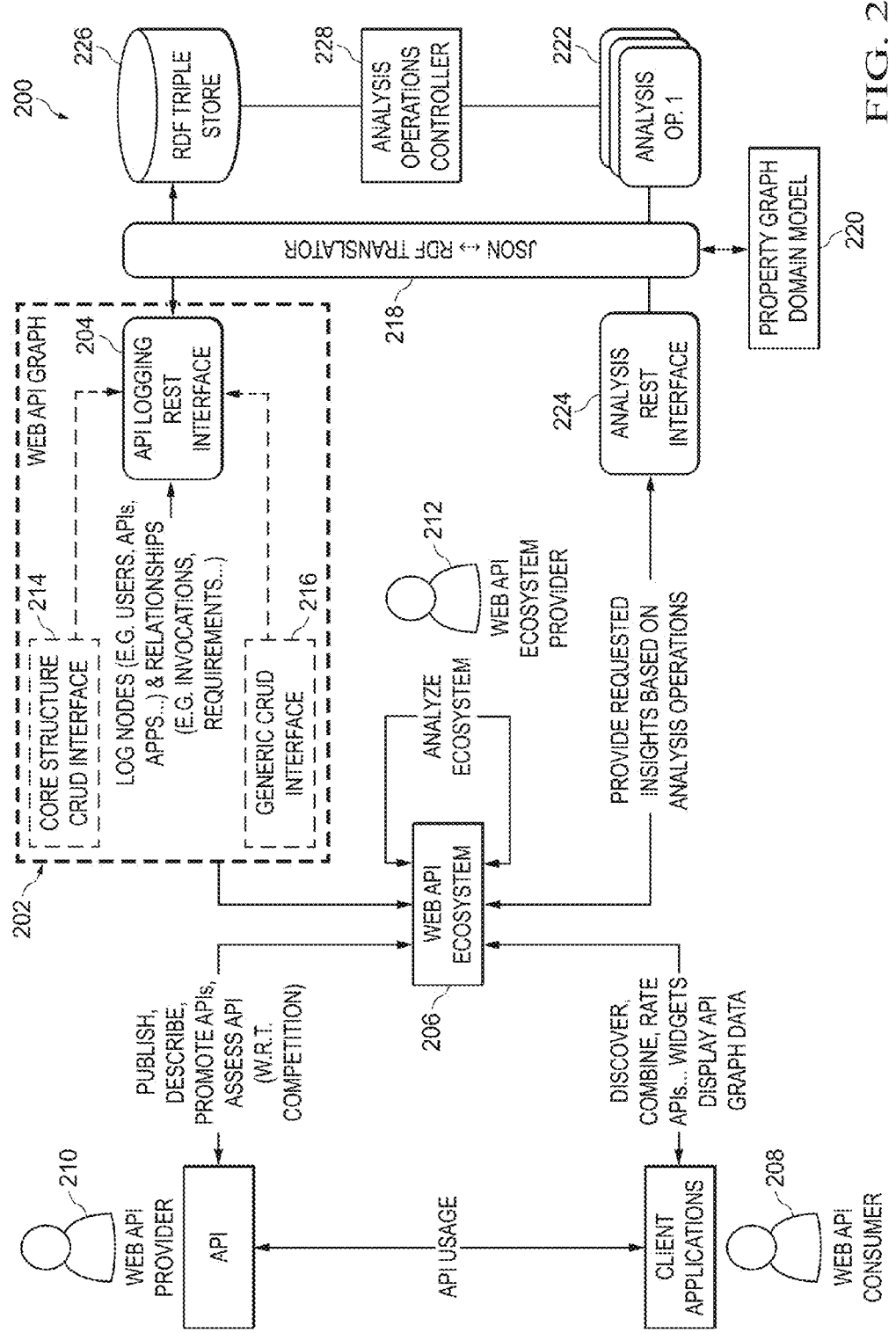
FIG. 2 is a schematic diagram showing components and architecture for a system pertaining to an embodiment of the invention

Referring to FIG. 2, there are shown components and architecture of a system 200, pertaining to an embodiment of the invention. The system 200 includes a Web API graph 202, which has a core structure 100 as described above. API graph 202 also has an interface 204, which is described hereinafter in further detail. Moreover, FIG. 2 shows an exemplary Web API ecosystem 206 with which system 200 is associated. FIG. 2 further depicts entities representing the three Web API ecosystem roles described above, that is API consumer 208, API provider 210, and API ecosystem provider 212.

Moreover, FIG. 2 shows exemplary activities that each role may carry out with respect to the Web API ecosystem 206. Thus, API consumer 208 can discover, combine, and rate respective APIs. API consumer 208 can also use widgets to provide tags for APIs, in order to display API graph data. Tags can be keywords, such as "social" or "location-based", or quantitative expressions. When a user creates a tag, a corresponding characteristic node may be created and a feature relationship between the API and the characteristic node, as shown by graph core structure 100, is also created.

FIG. 2 shows that API provider 210 interacts with ecosystem 206 by publishing, describing, promoting, and assessing APIs which it provides, particularly with respect to its competition. Ecosystem provider 212 interacts with API ecosystem 206 by analyzing the ecosystem.

Referring further to FIG. 2, there is shown data of the type to be collected from API ecosystem 206, as described above, being transferred to the API graph 202. This data includes node related data for the graph core structure, such as users, APIs, and applications, and further data comprising relationships. Such data also includes invocations, requirements, features, and provisions. Moreover, all of this data needs to be logged or entered into a log file, register, or record, together with appropriate timestamps.

In the system of the embodiment of FIG. 2, a log file or record for the above data is usefully provided in a Resource Description Framework (RDF) triple store 226, which is used to persist the data. Representing data in RDF form, as described hereinafter in further detail, is very convenient since RDF data can be reused in a number of other contexts.

In order to translate data of the above type from API graph 202 to RDF triple store 226, at least in part, API graph 202 is implemented as a service, denoting Representational State Transfer (REST) interfaces. A REST interface is generally an interface that allows selected intermediary components to be introduced at one or more points in the communication of a given data element, such as between a data graph structure and data store 226. This can be done without changing the interfaces between components. Interface 204 is referred to as an API logging REST interface. Interfaces 214 and 216 are two additional REST interfaces, which are both included in or comprise the REST interface 204. Interface 214 is a core structure CRUD (create, read, update, and delete) interface, and interface 216 is a generic CRUD interface.

Core structure CRUD interface 214 exposes the entities of the API graph's core structure described above in connection with FIG. 1. For each node (e.g., user or API), CRUD operations are provided at a designated endpoint (e.g., user or API). Additionally, these endpoints provide CRUD operations for the relationships defined in the API graph core structure that originate from these nodes. For example, creation or retrieval of an invocation relationship between user "A" and API "B" can be achieved by performing POST respectively GET to . . . /user/A/invocation/B. On the other hand, the generic CRUD interface 216 provides CRUD operations for any type of nodes and relationships. This interface allows the API graph to be extended beyond its core structure, by enabling relationships and nodes of any kind to be defined, as described above.

The two types of CRUD interfaces 214 and 216 also allow API graph 202 to be integrated with API ecosystem 206. In reaction to events in the ecosystem, corresponding actions can be triggered in the API graph using them. For example, if a new user or API is registered, a user or API node in the API graph can be posted. Or, if a user invokes an API, an invocation relationship between the two can be posted. Thus, a continuous data collection occurs, where events in the ecosystem are reflected in the API graph.

The REST interfaces consume and produce data in Java Script Object Notation (JSON) format, which is useful for transmitting data objects comprising key-value or attribute-value pairs. This is described hereinafter. A resource representing a node contains its type, (e.g., "user"), id (e.g., "user_93"), href in the API graph (e.g., " . . . /user/user_93"), and lists of properties (e.g., "name=Erik Wittern"), incoming relationships (e.g., "user_7/contact/user_93") and outgoing relationships (e.g., "user_93/invocation/api_20"). Similarly, a resource representing a relationship contains its type (e.g., "invocation"), id (e.g., "user_93/invocation/api_20"), href in the API graph (e.g., " . . . /user/user_93/invocation/api_20"), source and source href, target and target href, and a list of properties.

The system of FIG. 2 further includes a JSON/RDF translator 218, which is responsible for translating between JSON representation of data and RDF triple store 226, which is used to persist the data. To carry this out, received JSON is decoded by the translator to an intermediary property graph domain model 220. In the implementation, domain model 220 uses plain old Java objects (POJOs). The POJOs are then translated to RDF triples, which are persisted in RDF triple store 226. In reverse, when requesting data from the API graph, required triples are retrieved from the RDF triple store using SPARQL queries. JSON/RDF translator 218 populates corresponding POJOs out of the triples, which are encoded in JSON and provided at the REST interfaces.

In order to carry out the above translation, data in the API graph must be represented in the form of an RDF graph. Utilizing RDF enables the API graph's dataset to be integrated with others, following the idea of open linked data. For example, RDF datasets capturing social relations between users or technical properties of APIs can readily be integrated with the API graph. Similarly, the RDF data representing data from the API graph can thereby be reused in other contexts as well. In RDF, information is stored in triples consisting of a resource, a predicate, and an object. Objects can either be other resources, allowing triples to depict relationships between them, or literals, allowing triples to depict properties of resources. The relationships defined in the API graph core structure have properties. In RDF, however, predicates cannot in a standard way act as resources of triples, and thus cannot have their own properties. To overcome this problem, embodiments of the invention map the property graph representation of the API graph core structure 100 to RDF.

More particularly, to represent nodes from the API graph in RDF, a resource representing the API graph node is defined. As stated above, each property of nodes and edges in the API graph is specified as a key-value pair. Thus, for each property of the node, a triple originating from that resource is defined whose predicate represents the key of the property and whose literal represents the value of the property. For each relationship of the property graph representation, another resource is defined. Again, to represent properties of the relationship, triples whose objects are literals and that originate from this resource are defined. Thus, as least two triples are required to represent a relationship between two nodes in the property graph, one originating from the source and targeting the relationship, and one originating from the relationship, and targeting the target node. The naming conventions has <relationship name>, and <relationship of> are used for the predicates of these two triples. While this mapping results in an increased number of triples, it allows relationships, represented as resources, to be the origin of as many further descriptive triples as needed.

An example of a key-value pair for an embodiment of the invention, or attribute-value pair, could be the following:

[apig:user_1000, apig:type, apig:Node]

The key or attribute of this key-value pair would be the "type" of user_100 in an API graph. The value would be "node".

Another example of a key-value pair would be the following:

[apig:api_62/feature/availability, apig:creationdate, "2013-08-16T09:50:33.615-04:00" ^^http://www.w3org/2001/XMLSchema#dateTime]".

The key for this key-value pair would be the creation date and time of availability for API—62 of the API graph. The value would be "2013-08-16T13:55:35.133-04:00".

The API graph as described above can be used to obtain critical insights about API ecosystems, and also about consumption patterns of respective APIs and applications. This is achieved by carrying out analysis operations on the API graph, such as by executing selected information queries over the graph entities and relationships. To access analysis operations using the API graph, a dedicated analysis operations interface 224 is provided, which is referred to as an analysis REST interface. This interface 224 furnishes dedicated endpoints for each analysis operation, allowing for example, retrieval of a list of APIs that fulfill some of the user's requirements for characteristics by issuing a GET to . . . /analysis/requirements matching/user ID. Analysis operations 222 are performed by an analysis operations controller 228, which issues required SPARQL queries to RDF triple store 226. The queries for example can pertain to a particular web API and/or a particular web API user. Resulting data is translated to JSON by translator component 218 and provided via REST interface 224.

Thus, analysis operations may make use of data pertaining to the Web API ecosystem that was delivered previously to the RDF triple store from the Web API graph. FIG. 2 further shows that results of analysis operations, such as requested insights or usage query results, may be provided to API ecosystem 206. Results of analysis operations may also be routed to API graph 202 by translator component 218, as some of the data which is routinely collected by the API graph.

Figure 3:
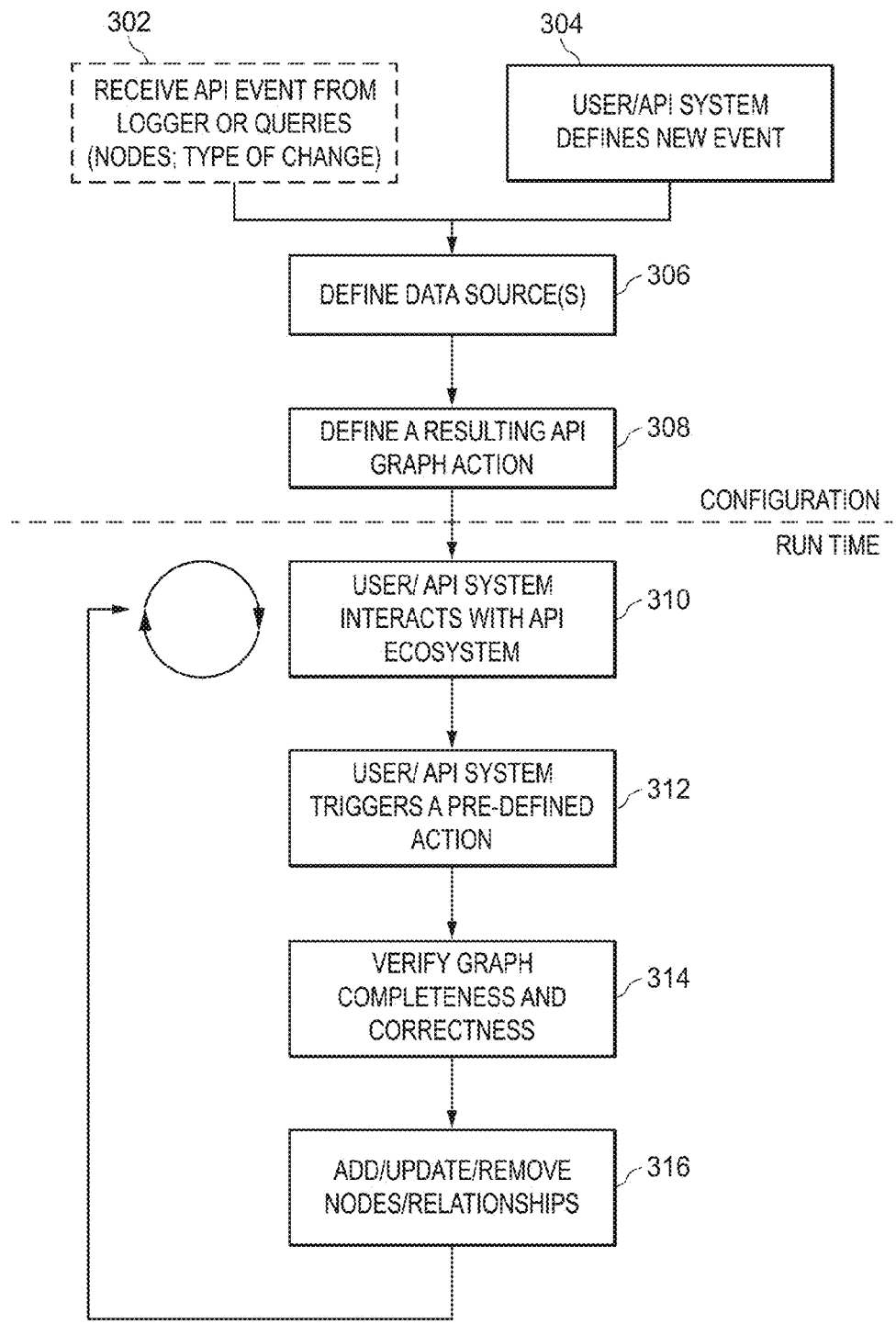
FIG. 3 is a flowchart showing steps of a method pertaining to an embodiment the invention.

Referring to FIG. 3, there is shown a flowchart of steps for a method associated with continuous collection of data pertaining to a Web API ecosystem, using a Web API graph as disclosed above. The method commences when either an event of step 302 or an event of step 304 occurs. A step 302 event is an event such as an API usage query associated with an analysis operation, or a change event of some type entered into a log file or record by the API graph, as described above. A step 304 event is a new event defined by either an API user or an API system. The API system comprises a platform or other component used by an API provider, such as provider 210 of FIG. 2, to make APIs available to API consumers.

To illustrate respective steps of the method for continuous data collection, several event examples are provided. As a first input event, a Web API provider makes a new API available to the API ecosystem, at step 304. Step 306 defines the data source for this event to be the API system used by the API provider. At step 308, an action required by the event for the API graph is defined, wherein the action comprises adding a new node to the graph to represent the new API. FIG. 3 shows that steps 302-308 comprise configuration steps, and the remaining steps 310-316 comprise runtime steps.

At step 310, the API system interacts with the ecosystem, to commence at step 312 the action that was defined at step 308. Step 314 verifies the completeness and correctness of the action, i.e., that the new node is required for the new API. The new node is added at step 316, and the method returns to step 310, for the next input event.

In another example, a user invokes the new API, as an event 304. The action defined at step 308 is thus creation of an invocation relationship in the API graph, between the user and the new API. This action is then carried out by runtime steps 310-316.

As a further example of a step 304 event, the API provider could supply pricing information for the new API. This would result in an API graph action of adding a new feature relationship, between the node for the new API and a characteristic node of the graph.

As an example of a step 302 event, a user could execute a usage query, to determine whether five specified contacts of the user are using the new API. Data sources for this query would include contact information for the user node of the API graph. Further information would be whether graph nodes representing respective user contacts had any invocation relationships with the new API.

Figure 4:
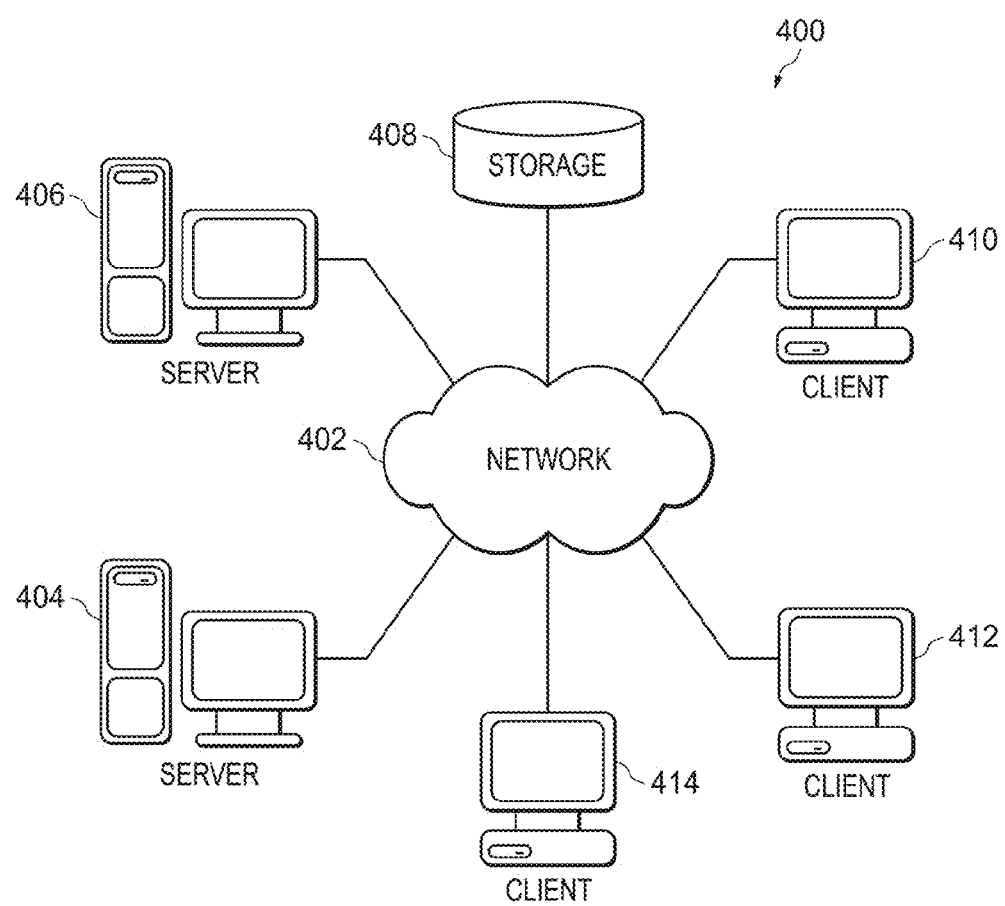
FIG. 4 is a block diagram showing a network of data processing systems in which an embodiment of the invention may be implemented.

FIG. 4 is a pictorial representation of a network of data processing systems in which illustrative embodiments of the invention may be implemented. Network data processing system 400 is a network of computers in which the illustrative embodiments may be implemented. Network data processing system 400 contains network 402, which is the medium used to provide communications links between various devices and computers connected together within network data processing system 400. Network 402 may include connections, such as wire, wireless communication links, or fiber optic cables.

In the depicted example, server computer 404 and server computer 406 connect to network 402 along with storage unit 408. In addition, client computers 410, 412, and 414 connect to network 402. Client computers 410, 412, and 414 may be, for example, personal computers or network computers. In the depicted example, server computer 404 provides information, such as boot files, operating system images, and applications to client computers 410, 412, and 414. Client computers 410, 412, and 414 are clients to server computer 404 in this example. Network data processing system 400 may include additional server computers, client computers, and other devices not shown.

Program code located in network data processing system 400 may be stored on a computer-recordable storage medium and downloaded to a data processing system or other device for use. For example, program code may be stored on a computer-recordable storage medium on server computer 404 and downloaded to client computer 410 over network 402 for use on client computer 410.

In the depicted example, network data processing system 400 is the Internet with network 402 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational and other computer systems that route data and messages. Of course, network data processing system 400 also may be implemented as a number of different types of networks, such as, for example, an intranet, a local area network (LAN), or a wide area network (WAN). FIG. 4 is intended as an example, and not as an architectural limitation for the different illustrative embodiments.

Turning now to FIG. 5, an illustration of a data processing system is depicted in accordance with an illustrative embodiment. In this illustrative example, data processing system 500 includes communications fabric 502, which provides communications between processor unit 504, memory 506, persistent storage 508, communications unit 510, input/output (I/O) unit 512, and display 514.

Processor unit 504 serves to process instructions for software that may be loaded into memory 506. Processor unit 504 may be a number of processors, a multi-processor core, or some other type of processor, depending on the particular implementation. "A number," as used herein with reference to an item, means one or more items. Further, processor unit 504 may be implemented using a number of heterogeneous processor systems in which a main processor is present with secondary processors on a single chip. As another illustrative example, processor unit 504 may be a symmetric multi-processor system containing multiple processors of the same type.

Memory 506 and persistent storage 508 are examples of storage devices 516. A storage device is any piece of hardware that is capable of storing information, such as, for example, without limitation, data, program code in functional form, and/or other suitable information either on a temporary basis and/or a permanent basis. Storage devices 516 may also be referred to as computer readable storage devices in these examples. Memory 506, in these examples, may be, for example, a random access memory or any other suitable volatile or non-volatile storage device. Persistent storage 508 may take various forms, depending on the particular implementation.

For example, persistent storage 508 may contain one or more components or devices. For example, persistent storage 508 may be a hard drive, a flash memory, a rewritable optical disk, a rewritable magnetic tape, or some combination of the above. The media used by persistent storage 508 also may be removable. For example, a removable hard drive may be used for persistent storage 508.

Communications unit 510, in these examples, provides for communications with other data processing systems or devices. In these examples, communications unit 510 is a network interface card. Communications unit 510 may provide communications through the use of either or both physical and wireless communications links.

Input/output unit 512 allows for input and output of data with other devices that may be connected to data processing system 500. For example, input/output unit 512 may provide a connection for user input through a keyboard, a mouse, and/or some other suitable input device. Further, input/output unit 512 may send output to a printer. Display 514 provides a mechanism to display information to a user.

Instructions for the operating system, applications, and/or programs may be located in storage devices 516, which are in communication with processor unit 504 through communications fabric 502. In these illustrative examples, the instructions are in a functional form on persistent storage 508. These instructions may be loaded into memory 506 for processing by processor unit 504. The processes of the different embodiments may be performed by processor unit 504 using computer-implemented instructions, which may be located in a memory, such as memory 506.

These instructions are referred to as program code, computer usable program code, or computer readable program code that may be read and processed by a processor in processor unit 504. The program code in the different embodiments may be embodied on different physical or computer readable storage media, such as memory 506 or persistent storage 508.

Program code 518 is located in a functional form on computer readable media 520 that is selectively removable and may be loaded onto or transferred to data processing system 500 for processing by processor unit 504. Program code 518 and computer readable media 520 form computer program product 522 in these examples. In one example, computer readable media 520 may be computer readable storage media 524 or computer readable signal media 526.

Computer readable storage media 524 may include, for example, an optical or magnetic disk that is inserted or placed into a drive or other device that is part of persistent storage 508 for transfer onto a storage device, such as a hard drive, that is part of persistent storage 508. Computer readable storage media 524 also may take the form of a persistent storage, such as a hard drive, a thumb drive, or a flash memory, that is connected to data processing system 500.

In some instances, computer readable storage media 524 may not be removable from data processing system 500. In these examples, computer readable storage media 524 is a physical or tangible storage device used to store program code 518 rather than a medium that propagates or transmits program code 518. Computer readable storage media 524 is also referred to as a computer readable tangible storage device or a computer readable physical storage device. In other words, computer readable storage media 524 is media that can be touched by a person.

Alternatively, program code 518 may be transferred to data processing system 500 using computer readable signal media 526. Computer readable signal media 526 may be, for example, a propagated data signal containing program code 518. For example, computer readable signal media 526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 518 may be downloaded over a network to persistent storage 508 from another device or data processing system through computer readable signal media 526 for use within data processing system 500. For instance, program code stored in a computer readable storage medium in a server data processing system may be downloaded over a network from the server to data processing system 500. The data processing system providing program code 518 may be a server computer, a client computer, a remote data processing system, or some other device capable of storing and transmitting program code 518. For example, program code stored in the computer readable storage medium in data processing system 500 may be downloaded over a network from the remote data processing system to the computer readable storage medium in data processing system 500. Additionally, program code stored in the computer readable storage medium in the server computer may be downloaded over the network from the server computer to a computer readable storage medium in the remote data processing system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In association with a Web API ecosystem and one or more Web API users, a computer implemented method comprising:

identifying specified events over a given period of time that respectively affect the Web API ecosystem, wherein at least one of the specified events comprises an interaction between the Web API ecosystem and either a Web API user, or a specified Web API, selectively;

constructing a data structure, comprising a Web API graph core structure as a property graph, that contains a data element representing each identified event in a continuous collection of data including collection of two or more types of data in which a first type of data comprises events that occur in an associated Web API ecosystem, and are live-logged; and using a specified interface to translate respective data elements, representing identified events, between the data structure and a specified data store by:

translating an initial representation of the respective data elements into a first format used by a translator;

decoding the respective data elements in the first format by the translator into an intermediary format; and translating the respective data elements in the intermediary format by the translator into a format of the specified data store, wherein the specified data store represents each translated data element in a form which is different from the form used to represent the respective data elements in the data structure, and wherein at least two triples are required to represent a relationship between two nodes in the property graph, a first triple of the at least two triples originating from a source and targeting the relationship, and a second triple of the at least two triples originating from the relationship and targeting a target node.

2. The method of claim 1, wherein:

data elements representing identified events are continuously collected for the data structure during the given period of time, and wherein identified events further comprise relationships between Web API users and Web APIs.

3. The method of claim 2, wherein:

identified events include, selectively, at least registration of a Web API, registration of the Web API user, provision of the Web API, and invocation of the Web API.

4. The method of claim 1, wherein:

the data structure comprises the Web API graph core structure having nodes and edges, and wherein a given node selectively comprises the Web API, an application, or the Web API user, and wherein a given edge comprises a relationship that is one of the relationship between the Web API and the Web API user, the relationship between different Web API users, or the relationship between different Web APIs.

5. The method of claim 4, wherein:

the Web API graph core structure has at least one node comprising a characteristic node, and wherein each characteristic node represents a functionality or a non-functionality that is shared among multiple Web API nodes, selectively, a Web API user node has a contact relationship with each of one or more other Web API users, and a Web API node has a connection relationship with each of one or more other Web APIs.

6. The method of claim 1, wherein:

a timestamp indicating the time at which an identified event occurs is applied to the data element representing that identified event.

7. The method of claim 1, wherein the first format of the translator is a JSON representation, and wherein the intermediary format of the translator is an intermediary property graph domain model, and wherein translated data elements in the specified data store are represented in the form of a Resource Description Framework (RDF) graph.

8. The method of claim 7, wherein:

the constructed data structure comprises the property graph having nodes and edges, and wherein each property of respective nodes and edges has a key-value pair, and wherein the key-value pair of a given property is used to represent specified information pertaining to the given property in the RDF graph, and wherein for the respective nodes from a Web API graph in the RDF graph, a resource representing a Web API graph node is defined and each property of the respective nodes and respective edges in the Web API graph is specified as a key-value pair, and wherein for each property of a respective node, a triple originating from that resource is defined whose predicate represents a key of the property and whose literal represents a value of the property, and wherein for each relationship of a property graph representation, another resource is defined to represent properties of the relationship as triples whose objects are literals and that originate from this resource.

9. The method of claim 1, wherein:

the specified interface allows selected intermediary components to be introduced at one or more points in the translation of a given data element between the data structure and the specified data store, and wherein interfaces between components remain unchanged.

10. The method of claim 9, wherein:

the specified interface comprises a representational transfer (REST) interface, and wherein a core structure CRUD interface exposes the given data element of the Web API graph core structure, and wherein a generic CRUD interface provides CRUD operations for any type of nodes and relationships.

11. The method of claim 1, wherein:

specified data pertaining to the Web API ecosystem, which was previously translated to the specified data store from the data structure, is delivered by an interface for use in carrying out a specified analysis operation.

12. The method of claim 11, wherein:

the specified analysis operation comprises a query pertaining to a particular web API or to a particular web API user, selectively, of the Web API ecosystem, and results of the query are routed to the data structure.

13. In association with a Web API ecosystem and one or more Web API users, a computer program product having instructions executable by a computer stored in a computer readable storage medium, the instructions comprising:

instructions for identifying specified events over a given period of time that respectively affect the Web API ecosystem, wherein at least one of the specified events comprises an interaction between the Web API ecosystem and either a Web API user, or a specified web API, selectively;

instructions for constructing a data structure, comprising a Web API graph core structure as a property graph, that contains a data element representing each identified event in a continuous collection of data including collection of two or more types of data in which a first type of data comprises events that occur in an associated Web API ecosystem, and are live-logged; and instructions for using a specified interface to translate respective data elements, representing identified events, between the data structure and a specified data store, including instructions for translating an initial representation of the respective data elements into a first format used by a translator, instructions for decoding the respective data elements in the first format by the translator into an intermediary format, and instructions for translating the respective data elements in the intermediary format by the translator into a format of the specified data store, wherein the specified data store represents each translated data element in a form which is different from the form used to represent the respective data elements in the data structure, and wherein at least two triples are required to represent a relationship between two nodes in the property graph, a first triple of the at least two triples originating from a source and targeting the relationship, and a second triple of the at least two triples originating from the relationship and targeting a target node.

14. The computer program product of claim 13, wherein:

data elements representing identified events are continuously collected for the data structure during the given time period, and wherein the identified events further comprise relationships between the Web API users and Web APIs, registration of a Web API, registration of a Web API user, provision of a Web API, and invocation of a Web API.

15. The computer program product of claim 13, wherein:

the data structure comprises the Web API graph core structure having nodes and edges, and wherein a given node selectively comprises the Web API, an application, or the Web API user, and wherein a given edge comprises a relationship that is one of the relationship between the Web API and the Web API user, the relationship between different Web API users, or the relationship between different Web APIs.

16. The computer program product of claim 13, wherein:

a timestamp indicating the time at which an identified event occurs is applied to the data element representing that identified event.

17. The computer program product of claim 13, wherein:

the first format of the translator is a JSON representation, and wherein the intermediary format of the translator is an intermediary property graph domain model, and wherein translated data elements in the specified data store are represented in the form of a resource description framework (RDF) graph.

18. The computer program product of claim 17, wherein:

the constructed data structure comprises the property graph having nodes and edges, and wherein each property of respective nodes and edges has a key-value pair, and wherein the key-value pair of a given property is used to represent specified information pertaining to the given property in the RDF graph, and wherein for the respective nodes from a Web API graph in the RDF graph, a resource representing a Web API graph node is defined and each property of the respective nodes and respective edges in the Web API graph is specified as a key-value pair, and wherein for each property of a respective node, a triple originating from that resource is defined whose predicate represents a key of the property and whose literal represents a value of the property, and wherein for each relationship of a property graph representation, another resource is defined to represent properties of the relationship as triples whose objects are literals and that originate from this resource.

19. The computer program product of claim 13, wherein:

specified data pertaining to the Web API ecosystem, which was previously translated to the specified data store from the data structure, is delivered by an interface for use in carrying out a specified analysis operation.

20. In association with a Web API ecosystem and one or more Web API users, a computer system comprising:
- a bus;
- a memory connected to the bus, wherein program code is stored on the memory; and
- a processor unit connected to the bus, wherein the processor unit executes the program code;
- to identify specified events over a given period of time that respectively affect the Web API ecosystem, wherein at least one of the specified events comprises an interaction between the web API ecosystem and either a Web API user, or a specified Web API, selectively;
- to construct a data structure, comprising a Web API graph core structure as a property graph, that contains a data element representing each identified event in a continuous collection of data including collection of two or more types of data in which a first type of data comprises events that occur in an associated Web API ecosystem, and are live-logged; and
- to use a specified interface to translate respective data elements, representing identified events, between the data structure and a specified data store by:
  - translating an initial representation of the respective data elements into a first format used by a translator;
  - decoding the respective data elements in the first format by the translator into an intermediary format; and
  - translating the respective data elements in the intermediary format by the translator into a format of the specified data store, wherein the specified data store represents each translated data element in a form which is different from the form used to represent the respective data elements in the data structure, and wherein at least two triples are required to represent a relationship between two nodes in the property graph, a first triple of the at least two triples originating from a source and targeting the relationship, and a second triple of the at least two triples originating from the relationship and targeting a target node.

* * * * *